US012672119B2

(12) United States Patent (10) Patent No.: US 12,672,119 B2
Liu (45) Date of Patent: Jun. 30, 2026

(54) METHOD AND APPARATUS FOR FREQUENCY BAND INDICATION, AND METHOD AND APPARATUS FOR FREQUENCY BAND DETERMINATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 298 days.

(21) Appl. No.: 18/575,718

(22) PCT Filed: Jun. 30, 2021

(86) PCT No.: PCT/CN2021/103722
§ 371 (c)(1),
(2) Date: Dec. 29, 2023

(87) PCT Pub. No.: WO2023/272618
PCT Pub. Date: Jan. 5, 2023

(65) Prior Publication Data
US 2024/0340874 A1 Oct. 10, 2024

(51) Int. Cl.
*H04W 72/0453* (2023.01)
*H04L 5/14* (2006.01)

(52) U.S. Cl.
CPC .......... *H04W 72/0453* (2013.01); *H04L 5/14* (2013.01)

(58) Field of Classification Search
CPC ......... H04L 5/001; H04L 5/0092; H04L 5/14; H04W 72/0453; H04W 72/23
See application file for complete search history.

(56) References Cited

U.S. PATENT DOCUMENTS

| | | | | |
|---|---|---|---|---|
| 10,440,665 | B1 * | 10/2019 | Witherell | ............ H04W 52/367 |
| 2011/0274076 | A1 * | 11/2011 | Classon | ................ H04L 5/0064 |
| | | | | 370/329 |
| 2012/0087323 | A1 * | 4/2012 | Feng | ..................... H04W 48/12 |
| | | | | 370/329 |

(Continued)

FOREIGN PATENT DOCUMENTS

| | | | |
|---|---|---|---|
| CN | 110999177 A | 4/2020 | |
| WO | WO 2010127480 A1 | 11/2010 | |

OTHER PUBLICATIONS

PCT/CN2021/103722, International Search Report dated Dec. 23, 2021, 2 pages.

*Primary Examiner* — Kashif Siddiqui
(74) *Attorney, Agent, or Firm* — Cozen O'Connor

(57) ABSTRACT

During a method for frequency-band indication and/or a method for frequency-band determination, a base station sends frequency band indication information to a terminal, to indicate to the terminal an aggregated frequency band for communicating with the base station. The aggregated frequency band has a new frequency band label number and includes more than one sub-frequency band. At least two adjacent sub-frequency bands of the more than one sub-frequency band are discontinuous. The terminal receives the frequency band indication information sent by the base station, and determines to communicate with the base station in the aggregated frequency band according to the frequency band indication information.

20 Claims, 6 Drawing Sheets

(56) References Cited

U.S. PATENT DOCUMENTS

| | | | |
|---|---|---|---|
| 2014/0098785 A1* | 4/2014 | Frenne | H04L 5/0007 |
| | | | 370/330 |
| 2019/0182016 A1* | 6/2019 | Guo | H04W 64/003 |
| 2019/0296946 A1* | 9/2019 | Zhang | H04L 27/2613 |
| 2020/0322952 A1* | 10/2020 | Dong | H04L 5/0037 |
| 2021/0360617 A1* | 11/2021 | Jia | H04W 74/0833 |

* cited by examiner sending frequency band indication information to a terminal, to indicate to the terminal an aggregated frequency band for communicating with the base station; wherein the aggregated frequency band has a new frequency band label and comprises more than one sub-frequency band, and at least two adjacent sub-frequency bands of the more than one sub-frequency band are discontinuous ~ S101

FIG. 1 sending frequency band indication information to a terminal, to indicate to the terminal an aggregated frequency band for communicating with the base station; wherein the aggregated frequency band has a new frequency band label and comprises more than one sub-frequency band, and at least two adjacent sub-frequency bands of the more than one sub-frequency band are discontinuous ~ S101 sending configuration information of at least one bandwidth part BWP to the terminal, to configure the at least one BWP to work in the aggregated frequency band and configure a bandwidth corresponding to each BWP ~ S202

FIG. 2

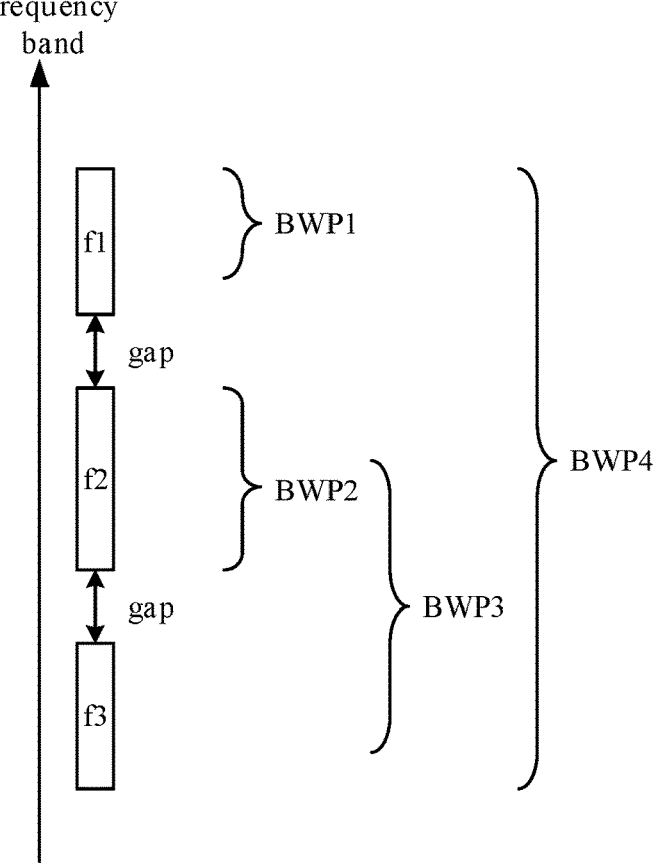

FIG. 3

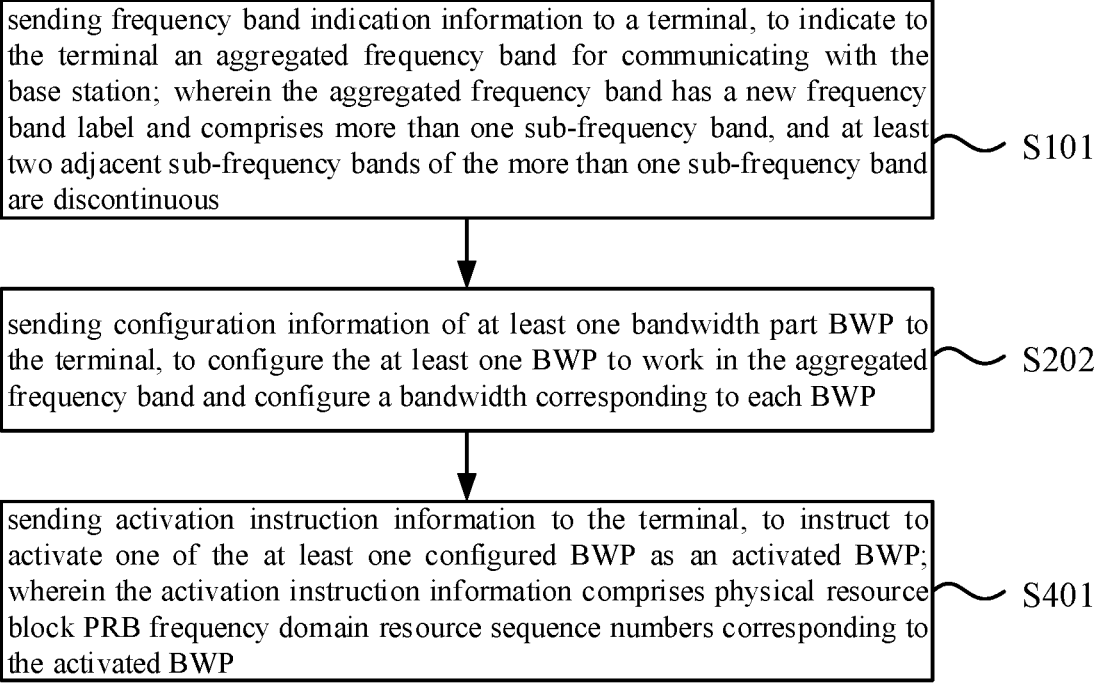

sending frequency band indication information to a terminal, to indicate to the terminal an aggregated frequency band for communicating with the base station; wherein the aggregated frequency band has a new frequency band label and comprises more than one sub-frequency band, and at least two adjacent sub-frequency bands of the more than one sub-frequency band are discontinuous ⟋ S101 sending configuration information of at least one bandwidth part BWP to the terminal, to configure the at least one BWP to work in the aggregated frequency band and configure a bandwidth corresponding to each BWP ⟋ S202 sending activation instruction information to the terminal, to instruct to activate one of the at least one configured BWP as an activated BWP; wherein the activation instruction information comprises physical resource block PRB frequency domain resource sequence numbers corresponding to the activated BWP ⟋ S401

FIG. 4 receiving frequency band indication information sent by a base station ⟋ S501 determining to communicate with the base station in an aggregated frequency band according to the frequency band indication information, wherein the aggregated frequency band has a new frequency band label and comprises more than one sub-frequency band, and at least two adjacent sub-frequency bands of the more than one sub-frequency band are discontinuous ⟋ S502

FIG. 5

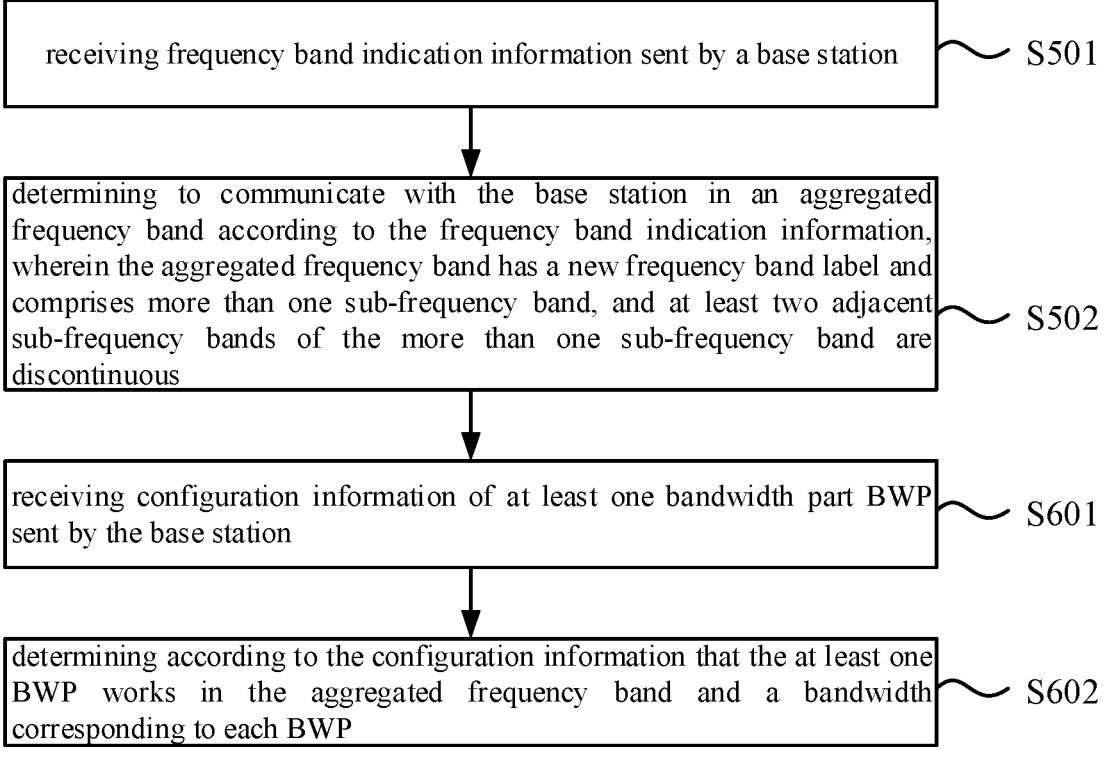

| receiving frequency band indication information sent by a base station | S501 |

| determining to communicate with the base station in an aggregated frequency band according to the frequency band indication information, wherein the aggregated frequency band has a new frequency band label and comprises more than one sub-frequency band, and at least two adjacent sub-frequency bands of the more than one sub-frequency band are discontinuous | S502 |

| receiving configuration information of at least one bandwidth part BWP sent by the base station | S601 |

| determining according to the configuration information that the at least one BWP works in the aggregated frequency band and a bandwidth corresponding to each BWP | S602 |

FIG. 6

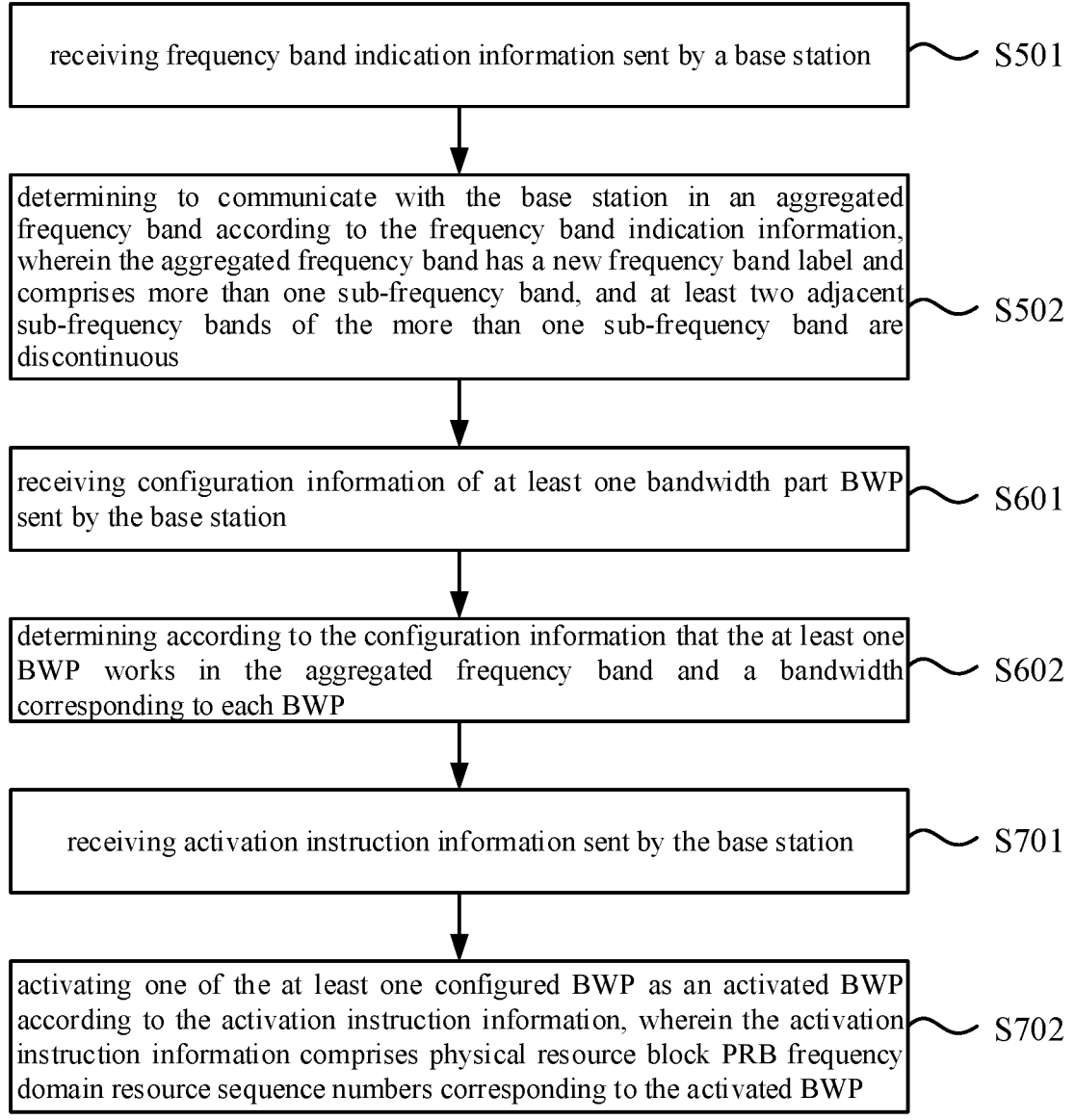

receiving frequency band indication information sent by a base station  ~ S501 determining to communicate with the base station in an aggregated frequency band according to the frequency band indication information, wherein the aggregated frequency band has a new frequency band label and comprises more than one sub-frequency band, and at least two adjacent sub-frequency bands of the more than one sub-frequency band are discontinuous  ~ S502 receiving configuration information of at least one bandwidth part BWP sent by the base station  ~ S601 determining according to the configuration information that the at least one BWP works in the aggregated frequency band and a bandwidth corresponding to each BWP  ~ S602 receiving activation instruction information sent by the base station  ~ S701 activating one of the at least one configured BWP as an activated BWP according to the activation instruction information, wherein the activation instruction information comprises physical resource block PRB frequency domain resource sequence numbers corresponding to the activated BWP  ~ S702

FIG. 7

METHOD AND APPARATUS FOR FREQUENCY BAND INDICATION, AND METHOD AND APPARATUS FOR FREQUENCY BAND DETERMINATION

CROSS-REFERENCE TO RELATED APPLICATIONS

This application is the US national phase application of International Application No. PCT/CN2021/103722, filed on Jun. 30, 2021, the entire contents of which are incorporated herein by reference.

TECHNICAL FIELD

The present disclosure relates to a field of communication technologies, and particularly to a method for frequency band indication, a method for frequency band determination, a base station for frequency band indication, and a terminal for frequency band determination.

BACKGROUND

With the development of communication technology, a base station and a terminal can communicate in more and more frequency bands. For example, in 5G, the communication frequency band has been extended to FR1 and FR2 frequency bands.

However, there are some restrictions on the frequency band for communication indicated by the base station to the terminal at present. For example, in general, the frequency band used for communication between base station and terminal is a continuous frequency band, or multiple continuous frequency bands. That is, the communication is performed via multiple frequency bands, but the multiple frequency bands are continuous, which may result in limited communication for certain frequency bands.

SUMMARY

According to a first aspect of embodiments of the present disclosure, a method for frequency band indication is provided. The method is performed by a base station, and includes: sending frequency band indication information to a terminal, to indicate to the terminal an aggregated frequency band for communicating with the base station. The aggregated frequency band has a new frequency band label and includes more than one sub-frequency band, and at least two adjacent sub-frequency bands of the more than one sub-frequency band are discontinuous.

According to a second aspect of embodiments of the present disclosure, a method for frequency band determination is provided. The method is performed by a terminal, and includes: receiving frequency band indication information sent by a base station; determining to communicate with the base station in an aggregated frequency band according to the frequency band indication information. The aggregated frequency band has a new frequency band label and includes more than one sub-frequency band, and at least two adjacent sub-frequency bands of the more than one sub-frequency band are discontinuous.

According to a third aspect of embodiments of the present disclosure, a base station is provided. The base station includes: a processor; and a memory storing a computer program. The processor is configured to, in response to execution of the computer program:

send frequency band indication information to a terminal, to indicate to the terminal an aggregated frequency band for communicating with the base station. The aggregated frequency band has a new frequency band label and includes more than one sub-frequency band, and at least two adjacent sub-frequency bands of the more than one sub-frequency band are discontinuous.

According to a fourth aspect of embodiments of the present disclosure, a terminal is provided. The terminal includes: a processor; and a memory storing a computer program. The processor is configured to perform the above method for frequency band determination.

BRIEF DESCRIPTION OF THE DRAWINGS

In order to more clearly illustrate the technical solutions in embodiments of the present disclosure, the drawings that need to be used in the description of the embodiments will be briefly introduced below.

FIG. 1 is a schematic flowchart of a method for frequency band indication according to an embodiment of the present disclosure.

FIG. 2 is a schematic flowchart of another method for frequency band indication according to an embodiment of the present disclosure.

FIG. 3 is a schematic diagram showing bandwidth parts (BWPs) in an aggregated frequency band according to an embodiment of the present disclosure.

FIG. 4 is a schematic flow chart showing another method for frequency band indication according to an embodiment of the present disclosure.

FIG. 5 is a schematic flowchart of a method for frequency band determination according to an embodiment of the present disclosure.

FIG. 6 is a schematic flowchart of another method for frequency band determination according to an embodiment of the present disclosure.

FIG. 7 is a schematic flow chart showing another method for frequency band determination according to an embodiment of the present disclosure.

DETAILED DESCRIPTION

Figure 8:
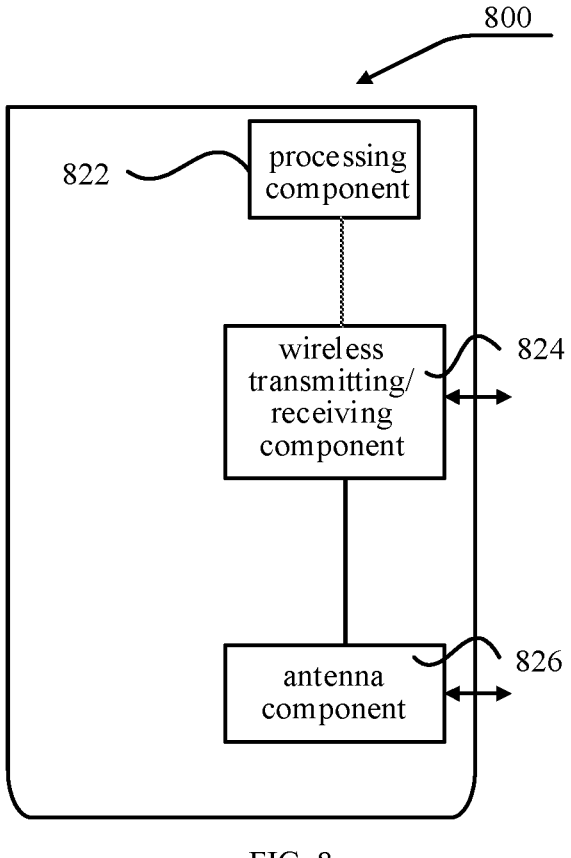
FIG. 8 is a schematic block diagram of an apparatus for frequency band indication according to an embodiment of the present disclosure.

Technical solutions in embodiments of the present disclosure will be clearly and completely described below with reference to the accompanying drawings in the embodiments of the present disclosure. Apparently, the described embodiments are only some of the embodiments of the present disclosure, not all of them. Based on the embodiments of the present disclosure, all other embodiments obtained by persons of ordinary skill in the art without creative efforts belong to the protection scope of the present disclosure.

Terms used in the embodiments of the present disclosure are for the purpose of describing specific embodiments only, and are not intended to limit the embodiments of the present disclosure. As used in the examples of this disclosure and the appended claims, the singular forms "a" and "an" are also intended to include the plural unless the context clearly dictates otherwise. It should also be understood that the term "and/or" as used herein refers to and includes any and all possible combinations of one or more of the associated listed items.

It should be understood that although the embodiments of the present disclosure may use the terms "first", "second", "third", etc. to describe various information, the information should not be limited to these terms. These terms are only used to distinguish information of the same type from one another. For example, without departing from the scope of the embodiments of the present disclosure, first information may also be called second information, and similarly, second information may also be called first information. Depending on the context, the word "if" as used herein may be interpreted as "when" or "in a case that" or "in response to".

For the purpose of brevity and ease of understanding, the terms used herein are "greater than" or "less than", "higher than" or "lower than" when representing a size relationship. But for those skilled in the art, it can be understood that the term "greater than" also covers the meaning of "greater than or equal to", and "less than" also covers the meaning of "less than or equal to"; the term "higher than" covers the meaning of "higher than or equal to", and "lower than" also covers the meaning of "lower than or equal to".

FIG. 1 is a schematic flowchart of a method for frequency band indication according to an embodiment of the present disclosure. The method for frequency band indication shown in the embodiment can be performed by a base station. The base station includes but is not limited to a base station in a communication system such as a 4G base station, a 5G base station, and a 6G base station. The base station can communicate with a terminal serving as user equipment, and the terminal includes but is not limited to an apparatus for communication such as a mobile phone, a tablet computer, a wearable device, a sensor, and an Internet of Things device.

As shown in FIG. 1, the method for frequency band indication may include the following steps.

In step S101, frequency band indication information is sent to a terminal, to indicate to the terminal an aggregated frequency band for communicating with the base station.

The aggregated frequency band has a new frequency band label and includes more than one sub-frequency band, and at least two adjacent sub-frequency bands of the more than one sub-frequency band are discontinuous.

In an embodiment, there may be some scattered frequency bands in the communication frequency band, these frequency bands are not continuous, and a bandwidth of each frequency band is small. For example, there are some scattered frequency bands around 1 GHz that are re-farmed for the 5G system, the bandwidths of these frequency bands are around 30M. It is difficult to use these frequency bands alone to meet the needs of some 5G communication service scenarios. For example, when performing an enhanced mobile broadband (eMBB) service, the required bandwidth must reach 100M.

According to the embodiment of the present disclosure, the base station can determine more than one sub-frequency band, and at least two adjacent sub-frequency bands of the more than one sub-frequency band are discontinuous. For example, there is a discontinuity between two adjacent sub-frequency bands of the more than one sub-frequency band, or there is a discontinuity between each sub-frequency band of the more than one sub-frequency band, or there is a continuity between some sub-frequency bands and there is a discontinuity between some sub-frequency bands. Then, the base station can indicate the more than one sub-frequency band as the aggregated frequency band to the terminal.

Therefore, the bandwidth of the more than one sub-frequency band that is used as the aggregated frequency band can meet the needs of most services, so that the sub-frequency band can be effectively utilized, even when its own bandwidth is small and is not continuous with other sub-frequency bands. In all the embodiments of the present disclosure, the at least two adjacent sub-frequency bands being discontinuous mean that there is a gap between the two adjacent sub-frequency bands, that is, the two adjacent sub-frequency bands are discontinuous in frequency.

It should be noted that the sub-frequency bands include, but are not limited to, the scattered frequency bands re-farmed for 5G. Each sub-frequency band in the aggregated frequency band is an independent frequency band before aggregation, and the aggregated frequency band obtained after aggregation is used as a new frequency band with a new frequency band label, and a label of the current existing frequency band is not used. That is, an identity of the aggregated frequency band is a unique identity, which is different from existing identities.

In an embodiment, the more than one sub-frequency band includes a time division duplexing (TDD) sub-frequency band and/or a frequency division duplexing (FDD) sub-frequency band.

When the more than one sub-frequency band of the aggregated frequency band is a time division duplexing sub-frequency band, the terminal may communicate with the base station in the aggregated frequency band in a time division duplex manner. When the more than one sub-frequency band in the aggregated frequency band is a frequency division duplexing sub-frequency band, the terminal may communicate with the base station in the aggregation frequency band in a frequency division duplex manner.

When some sub-frequency bands in the aggregation frequency band are time division duplexing sub-frequency bands, and the other sub-frequency bands are frequency division duplexing sub-frequency bands, there may be two situations: the time division duplexing sub-frequency bands may be uplink sub-frequency bands, and the frequency division duplexing sub-frequency bands may be downlink sub-frequency bands; the time division duplexing sub-frequency bands may be downlink sub-frequency bands, and the frequency division duplexing sub-frequency band may be uplink sub-frequency bands.

FIG. 2 is a schematic flowchart of another method for frequency band indication according to an embodiment of the present disclosure. As shown in FIG. 2, the method further includes:

in step S201, sending configuration information of at least one bandwidth part (BWP) to the terminal, to configure the at least one BWP to work in the aggregated frequency band and configure a bandwidth corresponding to each BWP.

In an embodiment, the base station may further send configuration information to the terminal, so as to configure at least one BWP in the aggregated frequency band for the terminal, and configure a bandwidth corresponding to each BWP. The terminal can determine the at least one BWP in the aggregated frequency band according to the configuration information, and determine the bandwidth corresponding to each BWP.

In embodiments of the present disclosure, the aggregated frequency band may be the aggregated frequency band obtained according to step 101, or may be an aggregated frequency band obtained according to any possible manner, which is not limited here.

In an embodiment, the at least one BWP includes 1 to 4 BWPs. That is, the base station may configure at least one BWP, and at most 4 BWPs, in the aggregated frequency band, which is the same as the number of BWPs currently configured in the frequency band. Therefore, modification to existing rules can be reduced.

FIG. 3 is a schematic diagram showing BWPs in an aggregated frequency band according to an embodiment of the present disclosure. As shown in FIG. 3, the bandwidth corresponding to the BWP includes at least one of:

a complete sub-frequency band, a partial bandwidth in a sub-frequency band, more than one complete sub-frequency band and a gap between the more than one complete sub-frequency band, or partial bandwidths in more than one sub-frequency band and a gap between the more than one sub-frequency band.

In an embodiment, as shown in FIG. 3, for example, the aggregated frequency band includes three sub-frequency bands f1, f2 and f3. The bandwidths of f1 and f3 are 30M, the bandwidth of f2 is 40M, and the bandwidth of the aggregated frequency band is 100M. There is a gap between two adjacent bandwidths. For example, the bandwidths of the two gaps shown in FIG. 3 are both 10M. The gap is an unavailable bandwidth (for a certain communication system). For example, f1, f2 and f3 are re-farmed to 5G system, but the gap is not re-farmed to 5G system, so the gap is not available in 5G system.

Taking the terminal configuring 4 BWPs in the aggregated frequency band as an example. For example, BWP1 may correspond to a partial bandwidth in the sub-frequency band f1, BWP2 may correspond to the complete sub-frequency band f2, BWP3 may correspond to the partial bandwidths in the two sub-frequency bands f2 and f3 and a gap between f2 and f3, and BWP4 may correspond to the three complete sub-frequency bands f1, f2, and f3, and two gaps between these three sub-frequency bands.

It should be noted that the bandwidths corresponding to the above four BWPs are only for relatively comprehensive expression of a correspondence relationship with sub-frequency bands, and the specific BWPs in the aggregated frequency bands are not limited to the embodiment shown in FIG. 3, and can be set as needed.

In an embodiment, the method further includes:

sending a physical broadcast channel (PBCH) and/or a synchronization signal block (SSB) on an initial BWP.

The initial BWP corresponds to a complete sub-frequency band or a partial bandwidth in a sub-frequency band.

The base station may select a bandwidth part in the bandwidth parts configured for the terminal as the initial BWP, and then send the physical broadcast channel on the initial BWP, and also send the synchronization signal block (which may include a synchronization signal and a physical broadcast channel) on the initial BWP.

Since the base station generally has not sent the above-mentioned configuration information to the terminal when sending the physical broadcast channel and/or SSB on the initial BWP, the terminal has not yet determined the bandwidth part BWP in the aggregated frequency band, but the terminal has determined the above-mentioned aggregated frequency band, so the terminal can search in the aggregated frequency band to roughly determine the initial BWP.

In this case, because the bandwidth corresponding to the gap is unavailable, the terminal generally does not search on the gap. Therefore, when the base station selects the initial BWP, it can preferentially select a BWP that does not include a gap as the initial BWP. For example, the initial BWP corresponds to a complete sub-frequency band or a partial bandwidth in a sub-frequency band, so that the terminal can search for the initial BWP.

In an embodiment, the initial BWP also corresponds to more than one complete sub-frequency band and a gap between the more than one complete sub-frequency band, or partial bandwidths in more than one sub-frequency band and a gap between the more than one sub-frequency band.

The base station may also select a BWP including a gap as the initial BWP. For example, all BWPs configured in the aggregated frequency band include gaps, and the base station may select a BWP including a gap as the initial BWP.

FIG. 4 is a schematic flow chart showing another method for frequency band indication according to an embodiment of the present disclosure. As shown in FIG. 4, the method further includes:

in step S401, sending activation instruction information to the terminal, to instruct to activate one of the at least one configured BWP as an activated BWP.

The activation instruction information includes physical resource block (PRB) frequency domain resource sequence numbers corresponding to the activated BWP.

In an embodiment, the base station may select a BWP to be activated from at least one BWP configured for the terminal through the activation instruction information, and the terminal may select the BWP to be activated from the at least one BWP configured by the base station according to the activation instruction information, and communicate with the base station on the activated BWP.

The base station may determine the PRB frequency domain resource sequence numbers corresponding to the activated BWP, and instruct the terminal by using the frequency domain resource sequence numbers as the activation instruction information. According to the frequency domain resources corresponding to the frequency domain resource sequence numbers, the terminal may determine the BWP instructed by the base station to be activated in the configured BWPs. For example, the frequency domain resource sequence numbers are PRBx to PRBy, where PRBx corresponds to the starting point of the sub frequency band f2 in FIG. 3 and PRBy corresponds to the ending point of the sub frequency band f2, then the terminal may determine that the activated BWP is BWP2.

In an embodiment, the terminal and the base station pre-store an association relationship between PRB frequency domain resource sequence numbers and frequency domain resources. A PRB corresponding to a gap between the sub-frequency bands is pre-marked as corresponding to the gap in the association relationship.

The terminal and the base station may pre-store the association relationship between the PRB frequency domain resource sequence numbers and the frequency domain resources. Then, according to the association relationship, the base station may determine, after determining the activated BWP, the PRB frequency domain resource sequence number corresponding to the frequency domain resource that corresponds to the starting point of the activated BWP, and the PRB frequency domain resource sequence number corresponding to the frequency domain resource that corresponds to the end point of the activated BWP. Then, the determined PRB frequency domain resource sequence numbers are sent to the terminal as the activation instruction information.

After receiving the activation instruction information, the terminal may determine the start point of the activated BWP and the end point of the activated BWP that correspond to the frequency domain resources corresponding to the PRB frequency domain resource sequence numbers according to the association relationship, and then determine the activated BWP according to the start point of the activated BWP and the end point of the activated BWP.

In an embodiment, the method further includes:

receiving capability information sent by the terminal; and determining a frequency band supported by the terminal according to the capability information, in which the frequency band supported by the terminal includes the aggregated frequency band.

The terminal may determine the frequency band supported by itself, and the terminal may support the aggregated frequency band, and indicate the frequency band supported by the terminal by sending capability information to the base station. The base station may determine the frequency band supported by the terminal according to the capability information. If the terminal supports the aggregated frequency band, the terminal may be instructed to communicate with the base station in the aggregated frequency band. If the terminal does not support the aggregated frequency band, the terminal may be instructed to communicate with the base station in a frequency band it supports.

FIG. 5 is a schematic flowchart of a method for frequency band determination according to an embodiment of the present disclosure. The method for frequency band determination shown in the embodiment can be performed by a terminal. The terminal includes but is not limited to an apparatus for communication such as a mobile phone, a tablet computer, a wearable device, a sensor, and an Internet of Things device. The terminal may serve as user equipment to communicate with a base station. The base station includes but is not limited to a base station in a communication system such as a 4G base station, a 5G base station, and a 6G base station.

As shown in FIG. 5, the method for frequency band determination may include the following steps:

in step S501, receiving frequency band indication information sent by a base station; and in step S502, determining to communicate with the base station in an aggregated frequency band according to the frequency band indication information, in which the aggregated frequency band has a new frequency band label and includes more than one sub-frequency band, and at least two adjacent sub-frequency bands of the more than one sub-frequency band are discontinuous.

In an embodiment, there may be some scattered frequency bands in the communication frequency band, these frequency bands are not continuous, and a bandwidth of each frequency band is small. For example, there are some scattered frequency bands around 1 GHz that are re-farmed for the 5G system, the bandwidths of these frequency bands are around 30M. It is difficult to use these frequency bands alone to meet the needs of some 5G communication service scenarios. For example, when performing an enhanced mobile broadband (eMBB) service, the required bandwidth must reach 100M.

According to the embodiment of the present disclosure, the base station can determine more than one sub-frequency band, and at least two adjacent sub-frequency bands of the more than one sub-frequency band are discontinuous. For example, there is a discontinuity between two adjacent sub-frequency bands of the more than one sub-frequency band, or there is a discontinuity between each sub-frequency band of the more than one sub-frequency band, or there is a continuity between some sub-frequency bands and there is a discontinuity between some sub-frequency bands. Then, the base station can indicate the more than one sub-frequency band as the aggregated frequency band to the terminal.

Therefore, the bandwidth of the more than one sub-frequency band that is used as the aggregated frequency band can meet the needs of most services, so that the sub-frequency band can be effectively utilized, even when its own bandwidth is small and is not continuous with other sub-frequency bands. In all the embodiments of the present disclosure, the at least two adjacent sub-frequency bands being discontinuous mean that there is a gap between the two adjacent sub-frequency bands, that is, the two adjacent sub-frequency bands are discontinuous in frequency.

It should be noted that the sub-frequency bands include, but are not limited to, the scattered frequency bands re-farmed for 5G. Each sub-frequency band in the aggregated frequency band is an independent frequency band before aggregation, and the aggregated frequency band obtained after aggregation is used as a new frequency band with a new frequency band label, and a label of the current existing frequency band is not used. That is, an identity of the aggregated frequency band is a unique identity, which is different from existing identities.

In an embodiment, the more than one sub-frequency band includes a time division duplexing (TDD) sub-frequency band and/or a frequency division duplexing (FDD) sub-frequency band.

When the more than one sub-frequency band of the aggregated frequency band is a time division duplexing sub-frequency band, the terminal may communicate with the base station in the aggregated frequency band in a time division duplex manner. When the more than one sub-frequency band in the aggregated frequency band is a frequency division duplexing sub-frequency band, the terminal may communicate with the base station in the aggregation frequency band in a frequency division duplex manner.

FIG. 6 is a schematic flowchart of another method for frequency band determination according to an embodiment of the present disclosure. As shown in FIG. 6, the method further includes:

in step S601, receiving configuration information of at least one bandwidth part BWP sent by the base station; and in step S602, determining according to the configuration information that the at least one BWP works in the aggregated frequency band and a bandwidth corresponding to each BWP.

In an embodiment, the base station may send configuration information to the terminal, so as to configure at least one BWP in the aggregated frequency band for the terminal, and configure a bandwidth corresponding to each BWP. The terminal can determine the at least one BWP in the aggregated frequency band according to the configuration information, and determine the bandwidth corresponding to each BWP. In another embodiment, the UE may determine the BWPs and the bandwidths corresponding to the BWPs according to relevant communication standards. The base station may determine the BWPs and the bandwidths corresponding to the BWPs according to the relevant communication standards. For example, a predetermined determination method (such as a calculation formula) is provided in the protocol to determine the bandwidths corresponding to the BWPs. In yet another embodiment, the UE may negotiate with the base station to determine the bandwidths corresponding to the BWPs. That is, the bandwidth corresponding to each BWP may be configured based on the base station, may also be determined based on a protocol, or may be determined through negotiation between the base station and the UE.

In an embodiment, the at least one BWP includes 1 to 4 BWPs. That is, the base station may configure at least one BWP, and at most 4 BWPs, in the aggregated frequency band, which is the same as the number of BWPs currently configured in the frequency band. Therefore, modification to existing rules can be reduced.

In an embodiment, the bandwidth corresponding to the BWP includes at least one of:

a complete sub-frequency band, a partial bandwidth in a sub-frequency band, more than one complete sub-frequency band and a gap between the more than one complete sub-frequency band, or partial bandwidths in more than one sub-frequency band and a gap between the more than one sub-frequency band.

In an embodiment, as shown in FIG. 3, for example, the aggregated frequency band includes three sub-frequency bands f1, f2 and f3. The bandwidths of f1 and f3 are 30M, the bandwidth of f2 is 40M, and the bandwidth of the aggregated frequency band is 100M. There is a gap between two adjacent bandwidths. For example, the bandwidths of the two gaps shown in FIG. 3 are both 10M. The gap is an unavailable bandwidth (for a certain communication system). For example, f1, f2 and f3 are re-farmed to 5G system, but the gap is not re-farmed to 5G system, so the gap is not available in 5G system.

Taking the terminal configuring 4 BWPs in the aggregated frequency band as an example. For example, BWP1 may correspond to a partial bandwidth in the sub-frequency band f1, BWP2 may correspond to the complete sub-frequency band f2, BWP3 may correspond to the partial bandwidths in the two sub-frequency bands f2 and f3 and a gap between f2 and f3, and BWP4 may correspond to the three complete sub-frequency bands f1, f2, and f3, and two gaps between these three sub-frequency bands.

In an embodiment, the method further includes:

receiving a physical broadcast channel and/or a synchronization signal block on an initial BWP.

The initial BWP corresponds to a complete sub-frequency band or a partial bandwidth in a sub-frequency band.

The base station may select a bandwidth part in the bandwidth parts configured for the terminal as the initial (initial) BWP, and then send the physical broadcast channel on the initial BWP, and also send the synchronization signal block (which may include a synchronization signal and a physical broadcast channel) on the initial BWP.

Since the base station generally has not sent the above-mentioned configuration information to the terminal when sending the physical broadcast channel and/or SSB on the initial BWP, the terminal has not yet determined the bandwidth part BWP in the aggregated frequency band, but the terminal has determined the above-mentioned aggregated frequency band, so the terminal can search in the aggregated frequency band to roughly determine the initial BWP.

In this case, because the bandwidth corresponding to the gap is unavailable, the terminal generally does not search on the gap. Therefore, when the base station selects the initial BWP, it can preferentially select a BWP that does not include a gap as the initial BWP. For example, the initial BWP corresponds to a complete sub-frequency band or a partial bandwidth in a sub-frequency band, so that the terminal can search for the initial BWP.

In an embodiment, the initial BWP also corresponds to more than one complete sub-frequency band and a gap between the more than one complete sub-frequency band, or partial bandwidths in more than one sub-frequency band and a gap between the more than one sub-frequency band.

The base station may also select a BWP including a gap as the initial BWP. For example, all BWPs configured in the aggregated frequency band include gaps, and the base station may select a BWP including a gap as the initial BWP.

FIG. 7 is a schematic flow chart showing another method for frequency band determination according to an embodiment of the present disclosure. As shown in FIG. 7, the method further includes:

in step S701, receiving activation instruction information sent by the base station; and in step S702, activating one of the at least one configured BWP as an activated BWP according to the activation instruction information, in which the activation instruction information includes physical resource block PRB frequency domain resource sequence numbers corresponding to the activated BWP.

In an embodiment, the base station may select a BWP to be activated from at least one BWP configured for the terminal through the activation instruction information, and the terminal may select the BWP to be activated from the at least one BWP configured by the base station according to the activation instruction information, and communicate with the base station on the activated BWP.

The base station may determine the PRB frequency domain resource sequence numbers corresponding to the activated BWP, and instruct the terminal by using the frequency domain resource sequence numbers as the activation instruction information. According to the frequency domain resources corresponding to the frequency domain resource sequence numbers, the terminal may determine the BWP instructed by the base station to be activated in the configured BWPs. For example, the frequency domain resource sequence numbers are PRBx to PRBy, where PRBx corresponds to the starting point of the sub frequency band f2 in FIG. 3 and PRBy corresponds to the ending point of the sub frequency band f2, then the terminal may determine that the activated BWP is BWP2.

In an embodiment, the terminal and the base station pre-store an association relationship between PRB frequency domain resource sequence numbers and frequency domain resources. A PRB corresponding to a gap between the sub-frequency bands is pre-marked as corresponding to the gap in the association relationship.

The terminal and the base station may pre-store the association relationship between the PRB frequency domain resource sequence numbers and the frequency domain resources. Then, according to the association relationship, the base station may determine, after determining the activated BWP, the PRB frequency domain resource sequence number corresponding to the frequency domain resource that corresponds to the starting point of the activated BWP, and the PRB frequency domain resource sequence number corresponding to the frequency domain resource that corresponds to the end point of the activated BWP. Then, the determined PRB frequency domain resource sequence numbers are sent to the terminal as the activation instruction information.

After receiving the activation instruction information, the terminal may determine the start point of the activated BWP and the end point of the activated BWP that correspond to the frequency domain resources corresponding to the PRB frequency domain resource sequence numbers according to the association relationship, and then determine the activated BWP according to the start point of the activated BWP and the end point of the activated BWP.

In an embodiment, the method further includes:

sending capability information to the base station, in which the capability information is configured to indicate a frequency band supported by the terminal, and the frequency band supported by the terminal includes the aggregated frequency band.

The terminal may determine the frequency band supported by itself, and the terminal may support the aggregated frequency band, and indicate the frequency band supported by the terminal by sending capability information to the base station. The base station may determine the frequency band supported by the terminal according to the capability information. If the terminal supports the aggregated frequency band, the terminal may be instructed to communicate with the base station in the aggregated frequency band. If the terminal does not support the aggregated frequency band, the terminal may be instructed to communicate with the base station in a frequency band it supports.

Corresponding to the foregoing embodiments of the method for frequency band indication and the method for frequency band determination, the present disclosure also provides embodiments of an apparatus for frequency band indication and an apparatus for frequency band determination.

Embodiments of the present disclosure provide an apparatus for frequency band indication, which can be applied to a base station. The base station includes but is not limited to a base station in a communication system such as a 4G base station, a 5G base station, and a 6G base station. The base station can communicate with a terminal serving as user equipment, and the terminal includes but is not limited to an apparatus for communication such as a mobile phone, a tablet computer, a wearable device, a sensor, and an Internet of Things device. In an embodiment, the terminal may be a terminal to which the method for frequency band indication described in any of the foregoing embodiments applies.

In an embodiment, the apparatus includes one or more processors configured to perform sending frequency band indication information to a terminal, to indicate to the terminal an aggregated frequency band for communicating with the base station.

The aggregated frequency band has a new frequency band label and includes more than one sub-frequency band, and at least two adjacent sub-frequency bands of the more than one sub-frequency band are discontinuous.

In an embodiment, the more than one sub-frequency band includes a time division duplexing sub-frequency band and/or a frequency division duplexing sub-frequency band.

In an embodiment, the processor is further configured to perform sending configuration information of at least one bandwidth part BWP to the terminal, to configure the at least one BWP to work in the aggregated frequency band and configure a bandwidth corresponding to each BWP.

In an embodiment, the at least one BWP includes 1 to 4 BWPs.

In an embodiment, the bandwidth corresponding to the BWP includes at least one of: a complete sub-frequency band, a partial bandwidth in a sub-frequency band, more than one complete sub-frequency band and a gap between the more than one complete sub-frequency band, or partial bandwidths in more than one sub-frequency band and a gap between the more than one sub-frequency band.

In an embodiment, the processor is further configured to perform sending a physical broadcast channel and/or a synchronization signal block on an initial BWP; in which, the initial BWP corresponds to a complete sub-frequency band or a partial bandwidth in a sub-frequency band.

In an embodiment, the initial BWP further corresponds to more than one complete sub-frequency band and a gap between the more than one complete sub-frequency band, or partial bandwidths in more than one sub-frequency band and a gap between the more than one sub-frequency band.

In an embodiment, the processor is further configured to perform sending activation instruction information to the terminal, to instruct to activate one of the at least one configured BWP as an activated BWP. The activation instruction information includes physical resource block PRB frequency domain resource sequence numbers corresponding to the activated BWP.

In an embodiment, the terminal and the base station pre-store an association relationship between PRB frequency domain resource sequence numbers and frequency domain resources, in which a PRB corresponding to a gap between the sub-frequency bands is pre-marked as corresponding to the gap in the association relationship.

In an embodiment, the processor is further configured to perform receiving capability information sent by the terminal; and determining a frequency band supported by the terminal according to the capability information, in which the frequency band supported by the terminal includes the aggregated frequency band.

Embodiments of the present disclosure also provide an apparatus for frequency band determination, and the apparatus can be applied to a terminal. The terminal includes but is not limited to a communication apparatus such as a mobile phone, a tablet computer, a wearable device, a sensor, and an Internet of Things device. The terminal may serve as user equipment to communicate with a base station, and the base station includes but is not limited to a base station in a communication system such as a 4G base station, a 5G base station, and a 6G base station.

In an embodiment, the apparatus includes one or more processors configured to perform receiving frequency band indication information sent by a base station; and determining to communicate with the base station in an aggregated frequency band according to the frequency band indication information, in which the aggregated frequency band has a new frequency band label and includes more than one sub-frequency band, and at least two adjacent sub-frequency bands of the more than one sub-frequency band are discontinuous.

In an embodiment, the more than one sub-frequency band includes a time division duplexing sub-frequency band and/or a frequency division duplexing sub-frequency band.

In an embodiment, the processor is further configured to perform receiving configuration information of at least one bandwidth part BWP sent by the base station; and determining according to the configuration information that the at least one BWP works in the aggregated frequency band and a bandwidth corresponding to each BWP.

In an embodiment, the at least one BWP includes 1 to 4 BWPs.

In an embodiment, the bandwidth corresponding to the BWP includes at least one of: a complete sub-frequency band, a partial bandwidth in a sub-frequency band, more than one complete sub-frequency band and a gap between the more than one complete sub-frequency band, or partial bandwidths in more than one sub-frequency band and a gap between the more than one sub-frequency band.

In an embodiment, the processor is further configured to perform receiving a physical broadcast channel and/or a synchronization signal block on an initial BWP; in which the initial BWP corresponds to a complete sub-frequency band or a partial bandwidth in a sub-frequency band.

In an embodiment, the initial BWP further corresponds to more than one complete sub-frequency band and a gap between the more than one complete sub-frequency band, or partial bandwidths in more than one sub-frequency band and a gap between the more than one sub-frequency band.

In an embodiment, the processor is further configured to perform receiving activation instruction information sent by the base station; and activating one of the at least one configured BWP as the activated BWP according to the activation instruction information, in which the activation instruction information includes physical resource block PRB frequency domain resource sequence numbers corresponding to the activated BWP.

In an embodiment, the terminal and the base station pre-store an association relationship between PRB frequency domain resource sequence numbers and frequency domain resources, in which a PRB corresponding to a gap between the sub-frequency bands is pre-marked as corresponding to the gap in the association relationship.

In an embodiment, the processor is further configured to perform sending capability information to the base station, in which the capability information is configured to indicate a frequency band supported by the terminal, and the frequency band supported by the terminal includes the aggregated frequency band.

With regard to the apparatuses in the above embodiments, the specific manner in which each module executes operations has been described in detail in the embodiments of related methods, and will not be described in detail here.

As for the apparatus embodiments, since they basically corresponds to the method embodiments, for related parts, please refer to the part description of the method embodiments. The apparatus embodiments described above are only illustrative, and the modules described as separate components may or may not be physically separated, and the components shown as modules may or may not be physical modules, that is, they may be located in one place, or may be distributed to multiple network modules. Part or all of the modules can be selected according to actual needs to achieve the purpose of the solution of the embodiments. It can be understood and implemented by those skilled in the art without creative effort.

Embodiments of the present disclosure also provide an apparatus for communication. The apparatus includes: a processor; a memory configured to store a computer program. When the computer program is executed by the processor, the method for frequency band indication described in any of the above-mentioned embodiments is implemented.

Embodiments of the present disclosure also provide an apparatus for communication. The apparatus includes: a processor; a memory configured to store a computer program. When the computer program is executed by the processor, the method for frequency band determination described in any of the above embodiments is implemented.

Embodiments of the present disclosure also provide a computer-readable storage medium configured to store a computer program. When the computer program is executed by a processor, steps of the method for frequency band indication described in any of the foregoing embodiments are implemented.

Embodiments of the present disclosure also provide a computer-readable storage medium configured to store a computer program. When the computer program is executed by a processor, steps of the method for frequency band determination described in any of the foregoing embodiments are implemented.

As shown in FIG. 8, FIG. 8 is a schematic block diagram of an apparatus 800 for frequency band indication according to an embodiment of the present disclosure. The apparatus 800 may be provided as a base station. Referring to FIG. 8, the apparatus 800 includes a processing component 822, a wireless transmitting/receiving component 824, an antenna component 826, and a signal processing part specific to a wireless interface. The processing component 822 may further include one or more processors. One of the processors in the processing component 822 may be configured to implement the method for frequency band indication described in any of the foregoing embodiments.

Figure 9:
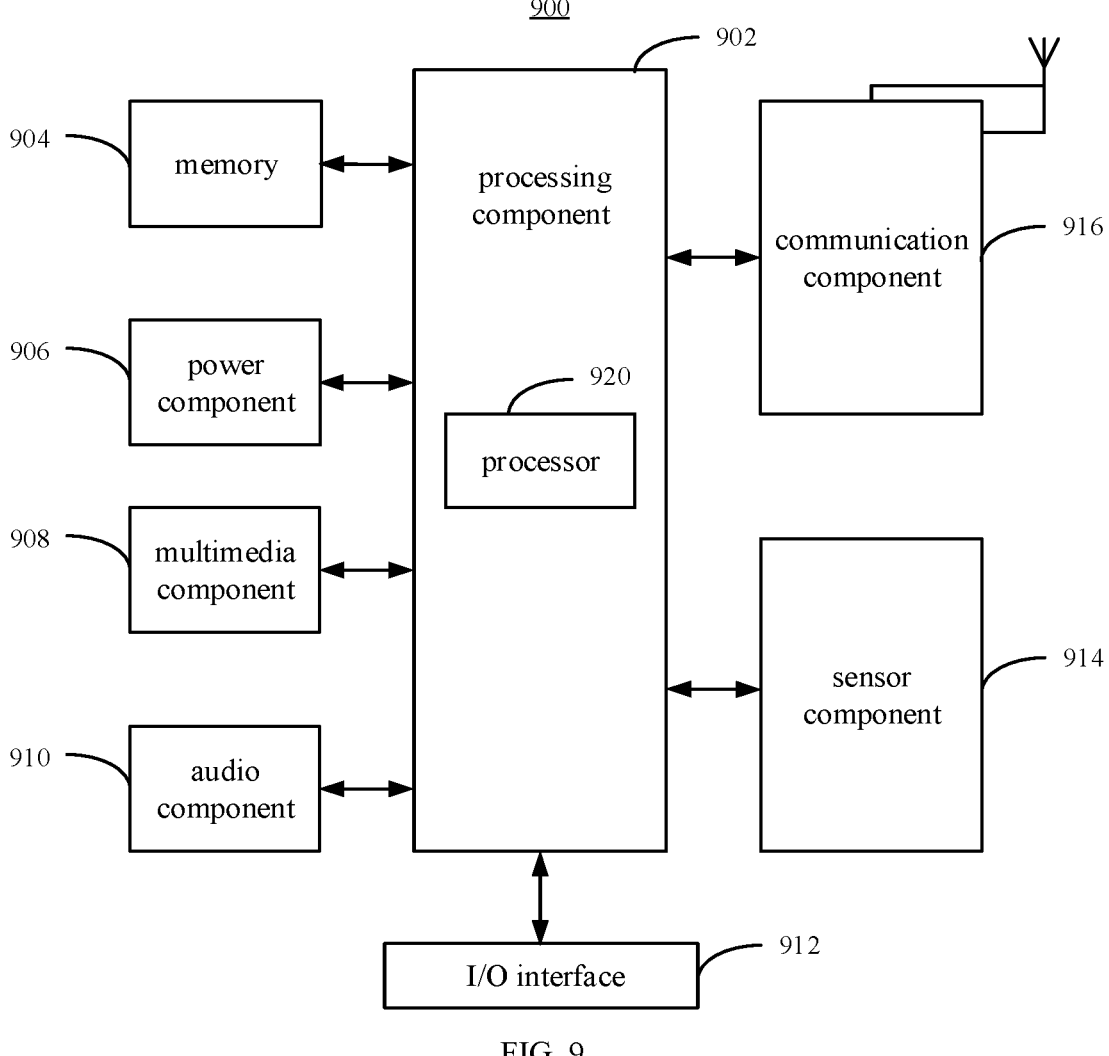
FIG. 9 is a schematic block diagram of an apparatus for frequency band determination according to an embodiment of the present disclosure.

FIG. 9 is a schematic block diagram of an apparatus 900 for frequency band determination according to an embodiment of the present disclosure. For example, the apparatus 900 may be a mobile phone, computer, digital broadcast terminal, messaging device, game console, tablet device, medical device, fitness device, personal digital assistant, and the like.

Referring to FIG. 9, the apparatus 900 may include at least one of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include at least one processor 920 to execute instructions to perform all or part of the steps in the above described method. Moreover, the processing component 902 may include at least one module which facilitates the interaction between the processing component 902 and other components. For example, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented using any type of volatile or nonvolatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a Liquid Crystal Display (LCD) and a Touch Panel (TP). In a case that the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the apparatus 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad of the apparatus 900, and the sensor component 914 may further detect a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G or 3G, 4G LTE, 5G NR or a combination thereof. In an embodiment, the communication component 916 receives a broadcast signal or broadcast associated information from an external broadcast management system via a physical broadcast channel. In an embodiment, the communication component 916 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In embodiments, the apparatus 900 may be implemented with at least one application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method of any embodiment.

In embodiments, there is also provided a non-transitory computer readable storage medium including instructions, such as included in the memory 904, executable by the processor 920 in the apparatus 900, for performing the above described methods for frequency band indication. For example, the non-transitory computer-readable storage medium may be a ROM, a RAM, a CD-ROM, a magnetic tape, a floppy disc, an optical data storage device, and the like.

Other implementations of the present disclosure will be readily apparent to those skilled in the art from consideration of the specification and practice of the disclosure disclosed herein. The present disclosure is intended to cover any modification, use or adaptation of the invention, these modifications, uses or adaptations follow the general principle of the invention and include common knowledge or conventional technical means in the technical field not disclosed in the present disclosure. The specification and embodiments are to be considered exemplary only, with a true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

It should be noted that relational terms such as "first" and "second" are used herein to distinguish one entity or operation from another entity or operation without necessarily requiring or implying any such actual relationship or order between such entities or operations. And, the terms "comprise", "include" or any other variations thereof, are intended to cover a non-exclusive inclusion, such that a process, a method, an article or a device including a series of elements not only includes those elements but also includes other elements not expressly listed, or may further include elements inherent to such process, method, article, or device. In the absence of more constraints, the elements defined by a sentence "comprise a" do not preclude the presence of additional same elements in the process, method, article, or device that includes the elements.

The methods and apparatuses provided by the embodiments of the present disclosure have been described above in detail. Herein, specific examples have been used to illustrate the principles and implementation methods of the present disclosure. The descriptions of the above embodiments are only used to help understand the methods and core idea disclosed in the present disclosure. At the same time, for those of ordinary skill in the art, according to the idea of the present disclosure, there will be changes in the specific implementation and application scope. In summary, the content of the specification should not be understood as a limitation to the present disclosure.

What is claimed is:

1. A method for frequency band indication, performed by a base station, comprising:
   sending frequency band indication information to a terminal, to indicate to the terminal an aggregated frequency band for communicating with the base station;
   wherein the aggregated frequency band has a new frequency band label and comprises more than one sub-frequency band, at least two adjacent sub-frequency bands of the more than one sub-frequency band are discontinuous, the more than one sub-frequency band comprises scattered frequency bands re-farmed for 5G, and the scattered frequency bands are frequency bands unable to be used alone to meet bandwidth requirements of 5G communication services.

2. The method according to claim 1, wherein the more than one sub-frequency band comprises at least one of a time division duplexing sub-frequency band or a frequency division duplexing sub-frequency band.

3. The method according to claim 1, further comprising: sending configuration information of at least one bandwidth part (BWP) to the terminal, to configure the at least one BWP to work in the aggregated frequency band and configure a bandwidth corresponding to each BWP.

4. The method according to claim 3, wherein each of the bandwidth corresponding to the BWP comprises at least one of:

a complete sub-frequency band, a partial bandwidth in a sub-frequency band, more than one complete sub-frequency band and a gap between the more than one complete sub-frequency band, or partial bandwidths in more than one sub-frequency band and a gap between the more than one sub-frequency band.

5. The method according to claim 3, further comprising: sending at least one of a physical broadcast channel or a synchronization signal block on an initial BWP;

wherein the initial BWP corresponds to a complete sub-frequency band or a partial bandwidth in a sub-frequency band.

6. The method according to claim 5, wherein the initial BWP further corresponds to more than one complete sub-frequency band and a gap between the more than one complete sub-frequency band, or partial bandwidths in more than one sub-frequency band and a gap between the more than one sub-frequency band.

7. The method according to claim 3, further comprising: sending activation instruction information to the terminal, to instruct to activate one of the at least one BWP, configured according to the configuration information, as an activated BWP;

wherein the activation instruction information comprises physical resource block (PRB) frequency domain resource sequence numbers corresponding to the activated BWP.

8. The method according to claim 7, wherein the terminal and the base station pre-store an association relationship between PRB frequency domain resource sequence numbers and frequency domain resources, wherein a PRB corresponding to a gap between the sub-frequency bands is pre-marked as corresponding to the gap in the association relationship.

9. The method according to claim 1, further comprising: receiving capability information sent by the terminal; and determining a frequency band supported by the terminal according to the capability information, wherein the frequency band supported by the terminal comprises the aggregated frequency band.

10. A method for frequency band determination, performed by a terminal, comprising:

receiving frequency band indication information sent by a base station; and determining to communicate with the base station in an aggregated frequency band according to the frequency band indication information, wherein the aggregated frequency band has a new frequency band label and comprises more than one sub-frequency band, at least two adjacent sub-frequency bands of the more than one sub-frequency band are discontinuous, the more than one sub-frequency band comprises scattered frequency bands re-farmed for 5G, and the scattered frequency bands are frequency bands unable to be used alone to meet bandwidth requirements of 5G communication services.

11. The method according to claim 10, wherein the more than one sub-frequency band comprises at least one of a time division duplexing sub-frequency band or a frequency division duplexing sub-frequency band.

12. The method according to claim 10, further comprising:

receiving configuration information of at least one bandwidth part (BWP) sent by the base station; and determining according to the configuration information that the at least one BWP works in the aggregated frequency band and a bandwidth corresponding to each BWP.

13. The method according to claim 12, wherein the bandwidth corresponding to the BWP comprises at least one of:

a complete sub-frequency band, a partial bandwidth in a sub-frequency band, more than one complete sub-frequency band and a gap between the more than one complete sub-frequency band, or partial bandwidths in more than one sub-frequency band and a gap between the more than one sub-frequency band.

14. The method according to claim 12, further comprising:

receiving at least one of a physical broadcast channel or a synchronization signal block on an initial BWP;

wherein the initial BWP corresponds to a complete sub-frequency band or a partial bandwidth in a sub-frequency band.

15. The method according to claim 14, wherein the initial BWP further corresponds to more than one complete sub-frequency band and a gap between the more than one complete sub-frequency band, or partial bandwidths in more than one sub-frequency band and a gap between the more than one sub-frequency band.

16. The method according to claim 12, further comprising:

receiving activation instruction information sent by the base station; and activating one of the at least one configured BWP as an activated BWP according to the activation instruction information, wherein the activation instruction information comprises physical resource block (PRB) frequency domain resource sequence numbers corresponding to the activated BWP.

17. The method according to claim 16, wherein the terminal and the base station pre-store an association relationship between PRB frequency domain resource sequence numbers and frequency domain resources, wherein a PRB corresponding to a gap between the sub-frequency bands is pre-marked as corresponding to the gap in the association relationship.

18. The method according to claim 10, further comprising:

sending capability information to the base station, wherein the capability information is configured to indicate a frequency band supported by the terminal, and the frequency band supported by the terminal comprises the aggregated frequency band.

19. A base station, comprising:

a processor; and a memory storing a computer program;

wherein the processor is configured to, in response to execution of the computer program:

send frequency band indication information to a terminal, to indicate to the terminal an aggregated frequency band for communicating with the base station;

wherein the aggregated frequency band has a new frequency band label and comprises more than one sub-frequency band, at least two adjacent sub-frequency bands of the more than one sub-frequency band are discontinuous, the more than one sub-frequency band comprises scattered frequency bands re-farmed for 5G, and the scattered frequency bands are frequency bands unable to be used alone to meet bandwidth requirements of 5G communication services.

20. A terminal, comprising:

a processor; and a memory storing a computer program;

wherein the processor is configured to, in response to execution of the computer program, perform the method for frequency band determination according to claim 10.

* * * * *